US005975772A

United States Patent [19]

Imai et al.

[11] Patent Number: 5,975,772

[45] Date of Patent: Nov. 2, 1999

[54] THERMAL DEVELOPING APPARATUS

[75] Inventors: Shinji Imai; Masaharu Ogawa, both of Kanagawa, Japan

[73] Assignee: Fuji Photo Film Co., Ltd., Kanagawa, Japan

[21] Appl. No.: 09/193,848

[22] Filed: Nov. 18, 1998

[30] Foreign Application Priority Data

Nov. 18, 1997 [JP] Japan .................................... 9-316969

[51] Int. Cl.[6] ............................ G03D 3/00; G03B 27/32; H05B 1/00

[52] U.S. Cl. ............................ 396/575; 355/27; 219/216

[58] Field of Search .................................... 396/575, 612; 250/317.1, 319; 219/216; 355/27

[56] References Cited

U.S. PATENT DOCUMENTS 3,864,709 2/1975 Bruns ...................................... 396/575
4,653,890 3/1987 Nordstrom et al. ....................... 355/27
5,463,444 10/1995 Watanabe et al. ......................... 355/27

FOREIGN PATENT DOCUMENTS 3-87827 4/1991 Japan .
4-211252 8/1992 Japan .

*Primary Examiner*—Alan A. Mathews
*Attorney, Agent, or Firm*—Sughrue, Mion, Zinn, Macpeak & Seas, PLLC

[57] ABSTRACT

There is provided a thermal developing apparatus comprising a heating medium for heating a light-sensitive thermally developable recording material, the heating medium having fine asperities on its contact surface to come in contact with the light-sensitive thermally developable recording material and a nip transport member for pinching and transporting the light-sensitive thermally developable recording material in cooperation with the heating medium as the light-sensitive thermally developable recording material is held in two-dimensional contact with at least one portion of the contact surface of the heating medium. Even in the case where dust or other foreign matter is deposited on the surface of the heating medium or where a flaw occurs on its surface, the entire surface of the light-sensitive thermally developable recording material can be uniformly heated to achieve thermal development without unevenness in its result, and gas produced during thermal development can be prevented from adversely affect the image, which ensures consistent formation of high-quality images having even and appropriate color densities.

29 Claims, 5 Drawing Sheets

THERMAL DEVELOPING APPARATUS

BACKGROUND OF THE INVENTION

This invention relates to the technical field of imaging with light-sensitive thermally developable recording materials, particularly to thermal developing apparatus that form color on exposed light-sensitive thermally developable recording materials by thermal development.

Images obtained by medical diagnoses such as those using ultrasonic imaging instruments, computerized tomography (CT), nuclear magnetic resonance (NMR) and X-ray imaging techniques are conventionally recorded on silver salt photographic materials, developed and processed into hard copies. Silver salt photographic materials have the advantage of yielding high-quality images but on the other hand they require wet processing involving color development, bleaching and rinsing and hence suffer from the problem of taking much time and labor in overall development processing. In addition, the maintenance of the developing machine (processor) is a time-consuming job. Under the circumstances, it is desired to produce hard copies by an image forming method that does not require any wet development processing.

Thermal image recording is a known technique capable of forming images without wet processes. As is well known, thermal image recording uses a thermal head having a glaze comprising heating elements arranged in one direction (main scanning direction) and with the glaze pressed against a thermal recording material, the two are moved in relative directions, one being the main scanning direction and the other being a direction normal to it, and image is recorded on the thermal recording material by generating heat from the specific heating elements as determined by the image to be recorded.

The quality of the image obtained by thermal recording has recently seen marked improvements and an extension of its use from the conventional ultrasonic imaging to other applications such as CT, NMR and X-ray imaging techniques that require big and high-quality images is being reviewed. However, in such aspects as recording density and tone reproduction, the image formed by exposing silver salt photographic materials to optical beams or the like is still advantageous.

This problem has been solved by an attractive method of image recording with light-sensitive thermally developable recording materials which form color by exposure and heating or which have color formed in the non-exposed area by heating with care being taken to avoid color formation by exposure. Such light-sensitive thermally developable recording materials are imagewise exposed to optical beams or the like to form a latent image and subsequently heated to form color in either the exposed area or the non-exposed area, thereby producing a hard copy with a recorded image. According to image recording with such light-sensitive thermally developable recording materials, high-definition and high-quality images can be formed by optical beam scanned exposure or the like but without performing any steps in wet development processing.

A thermal developing apparatus is necessary to perform thermal development in the process of image formation with the above-described light-sensitive thermally developable recording material (which is hereinafter referred to simply as the "recording material") and a known type of such apparatus comprises a heating drum having a built-in heater such as a halogen lamp and an endless belt wrapped around about two-thirds of the circumference of the heating drum. The recording material having a latent image formed by exposure is inserted between the heating drum and the endless belt and with the heating drum rotating at a specified speed, the recording material is pinched between the heating drum and the endless belt and transported as it is kept in close contact with the heating drum so that thermal development is achieved by heating at a specified temperature for a specified time.

The more closely the recording material is kept in contact with the heating drum, the higher the heat efficiency with which it is developed thermally. The color density of the recording material depends on the quantity of heat imparted from thermal development, so in order to form a high-quality image, a specified quantity of heat must be applied uniformly to the entire surface of the recording material. To this end, the surface of the heating drum is made flat enough by using metals or coating them with resins such as Teflon.

However, if dust or other foreign matter enters between the recording material and the heating drum during thermal development, the recording material "floats" microscopically and the efficiency of heat transfer in the affected area will decrease. As the result, the quantity of heat being imparted to the recording material by thermal development varies from place to place and uneven densities occur due to unevenness in thermal development. Similarly, if a flaw occurs on the surface of the heating drum, not only the damaged area of the recording material but also its nearby areas are deteriorated in heating efficiency and again the quantity of heat being imparted to the recording material by thermal development varies from place to place and uneven densities occur due to unevenness in thermal development.

The light-sensitive thermally developable recording material comprises a variety of layers including a support (base material) such as a polyethylene terephthalate (PET) film, an image forming layer having a color forming agent and a sensitizing agent dispersed and/or dissolved in a binder, a protective layer to protect the image forming layer, a back layer formed on the other side of the support opposite to the image forming layer.

In some types of the recording material, any components contained in the respective layers evaporate and/or decompose during thermal development to produce gas. The gas may often adversely affect the color formation on the recording material (image forming layer). Especially, the color density often varies abnormally due to the gas confined between the recording material and the heating drum during thermal development.

SUMMARY OF THE INVENTION

The present invention has been accomplished under these circumstances and has as an object providing a thermal developing apparatus with which a light-sensitive thermally developable recording material on which a latent image has been recorded by exposure is thermally developed to form color using a heating medium such as a heating drum and which, even in the case where dust or other foreign matter is deposited on the surface of the heating medium or where a flaw occurs on its surface, can develop the light-sensitive thermally developable recording material by heating its entire surface uniformly without causing unevenness in thermal development, and prevent gas produced during thermal development from adversely affecting the image, thereby ensuring consistent formation of high-quality images having even and appropriate color densities.

The stated object of the invention can be attained by a thermal developing apparatus which heats an imagewise exposed light-sensitive thermally developable recording material to form color comprising:

a heating medium for heating the light-sensitive thermally developable recording material, the heating medium having fine asperities on its contact surface to come in contact with the light-sensitive thermally developable recording material; and a nip transport means for pinching and transporting the light-sensitive thermally developable recording material so that the light-sensitive thermally developable recording material is held in two-dimensional contact with at least one portion of the contact surface of the heating medium.

Preferably, the fine asperities on the contact surface of the heating medium are 1–100 $\mu$m high, more preferably 10–100 $\mu$m high.

Preferably, a constituent material composing the contact surface of the heating medium which has the fine asperities is a material selected from the group consisting of aluminum, stainless steel, a resin coating aluminum and a resin coating stainless steel.

Preferably, the contact surface of the heating medium having the fine asperities is a rough surface obtained by a surface treatment for roughening a surface of a constituent material of the contact surface of the heating medium.

Preferably, the contact surface of the heating medium having the fine asperities comprises a constituent material composing the contact surface of the heating medium, a curable liquid resin coated and dried on the constituent material and fine particles dispersed in the dried curable liquid resin.

Preferably, the curable liquid resin is a polyimide resin or an epoxy resin and the fine particles are particles selected from the group consisting of metal particles, silica particles, zirconia particles, magnesia particles, alumina particles and mixtures thereof.

Preferably, the contact surface of the heating medium having the fine asperities is formed by coating on a constituent material composing the contact surface a hard coating agent which comprises a curable liquid resin having fine particles dispersed therein and drying the coated hard coating agent.

Preferably, the heating medium is movable and the nip transport means pinches and transports the light-sensitive thermally developable recording material in cooperation with the heating medium as the light-sensitive thermally developable recording material is held in two-dimensional contact with at least one portion of the contact surface of the heating medium.

Preferably, the heating medium is a rotatable heating drum comprising a cylindrical contact surface having the fine asperities and at least one heating source built in for heating purposes.

Preferably, the at least one heating source is a rod-type heating source located in a center of the rotatable heating drum or a plurality of rod-type heating sources located equally along an inner circumferential wall surface of the rotatable heating drum.

The rod-type heating source is preferably a rod-type light source for heating or a rod-type electric heater, more preferably a rod-type halogen lamp.

Preferably, the nip transport means comprises an endless belt which allows the light-sensitive thermally developable recording material to be held in two-dimensional contact with at least one portion of the contact surface of the rotatable heating medium so that the light-sensitive thermally developable recording material is pinched between the endless belt and the heating medium, the endless belt running synchronously along with action of the heating medium; and a plurality of support rollers supporting and stretching the endless belt.

Preferably, the heating medium is a rotatable heating drum comprising a cylindrical contact surface having the fine asperities and at least one heating source built in for heating purposes.

Preferably, the endless belt is wrapped around at least semicircle of the cylindrical contact surface of the rotatable heating drum.

Preferably, the thermal developing apparatus further comprises an inlet roller pair for feeding the light-sensitive thermal developable recording material into a space between the heating medium and the nip transport means, the inlet roller pair being provided closely in a start portion in two-dimensional contact with the heating medium and the nip transport means.

Preferably, the thermal developing apparatus further comprises a stripping finger for striping the light-sensitive thermal developable recording material from the heating medium, the stripping finger being provided closely in an end portion in two-dimensional contact with the heating medium and the nip transport means.

Preferably, the heating medium comprises a heating source, a cylindrical fixed heating medium having the heating source built in and a cylindrical heat transfer member which holds in sliding contact with an outer surface of the cylindrical fixed heating medium and rotates around the cylindrical fixed heating medium and which has the fine asperities on its outer contact surface.

Preferably, the heating source is a rubber heater provided along with an inner surface of the cylindrical fixed heating medium.

Preferably, heat transfer grease is interposed between an outer surface of the cylindrical fixed heating medium and an inner surface of the cylindrical heat transfer member.

Preferably, the heating medium is fixed and the nip transport means pinches and transports the light-sensitive thermally developable recording material in the state that the light-sensitive thermally developable recording material is held in two-dimensional contact with at least one portion of the contact surface of the fixed heating medium.

Preferably, the heating medium is a plate heater comprising the contact surface having the fine asperities and at least one heating source built in for heating purposes.

Preferably, the plate heater is a planar plate heater having a planer contact surface or a curved plate heater having a curved arc inner contact surface.

Preferably, the nip transport means comprises two transfer roller pairs for pinching and transporting the light-sensitive thermally developable recording material, the two transfer roller pairs being located upstream and downstream of the heating medium, respectively; and at least one press roller for pressing the light-sensitive thermally developable recording material against the contact surface of the heating medium having the fine asperities.

Preferably, the heating medium is a plate heater comprising the contact surface having the fine asperities and at least one heating source built in for heating purposes.

Preferably, the thermal developing apparatus further comprises a heat insulating cover for improving an efficiency of heat development due to the plate heater, the heat insulating cover being located behind the at least one press roller.

Preferably, the contact surface of the plate heater having the fine asperities is a lubricating contact surface.

Preferably, the lubricating contact surface of the plate heater comprises a fluoroplastic coating film subjected to a lubricating treatment on a surface of the plate heater or a lubricating sheet provided on the surface of the plate heater.

DETAILED DESCRIPTION OF THE INVENTION

The thermal developing apparatus of the invention will now be described in detail with reference to the preferred embodiments shown in the accompanying drawings.

Figure 1:
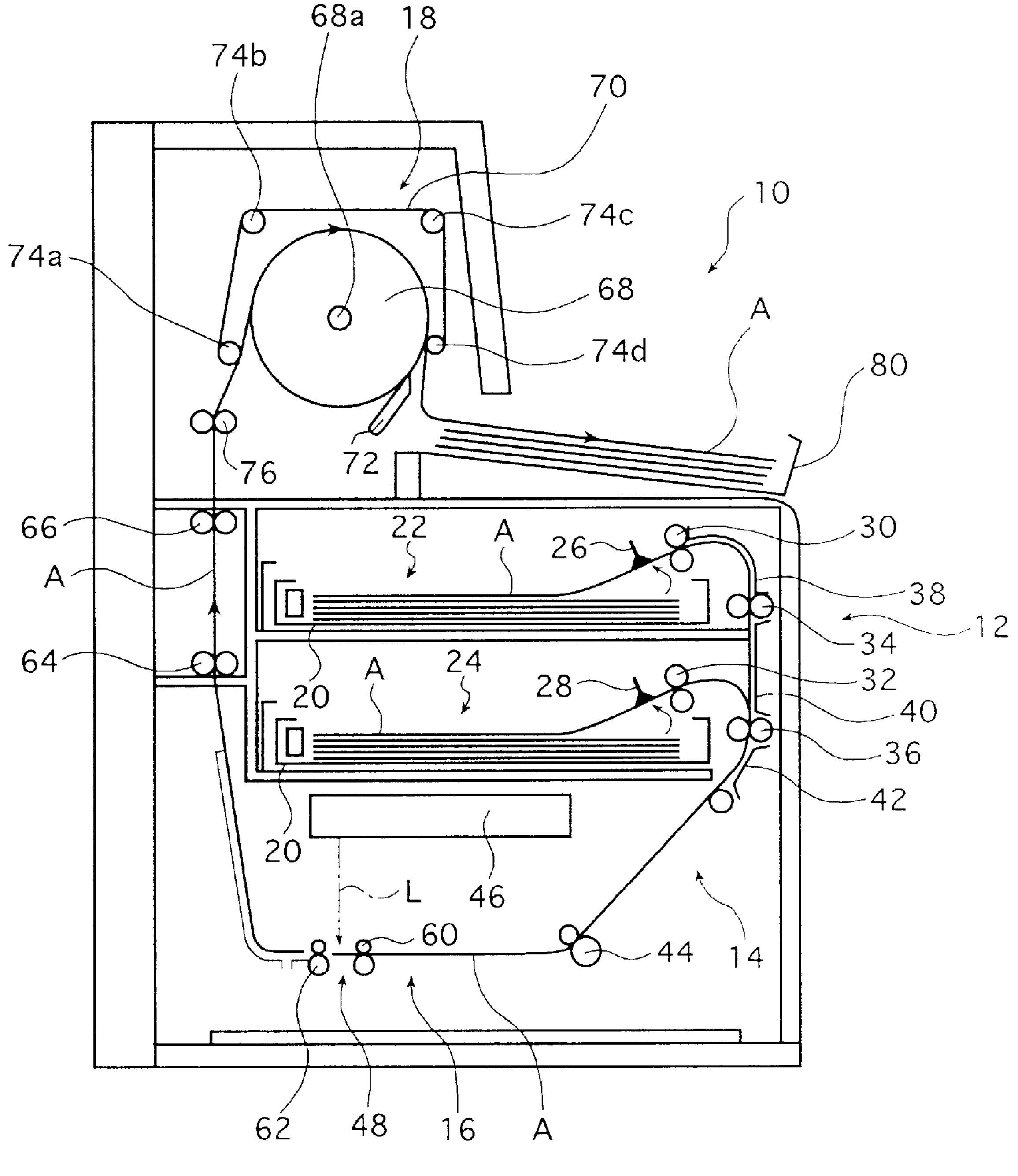
FIG. 1 shows diagrammatically an embodiment of the image forming apparatus using the thermal developing apparatus of the invention.

FIG. 1 shows diagrammatically an embodiment of the image forming apparatus using the thermal developing apparatus of the invention. The image forming apparatus generally indicated by 10 in FIG. 1 (which is hereinafter referred to simply as "forming apparatus 10") is an apparatus suitable for use as a so-called "medical imager" which produces prints that reproduce a visible image analyzed with a medical imaging instrument such as a CT or NMR imaging apparatus. The apparatus 10 uses a light-sensitive thermally developable recording material A having a light-sensitive thermally developable image forming layer formed on a support such as a PET film (such material is hereinafter referred to simply as "recording material A") and after a latent image is recorded on the recording material A by exposing it imagewise to an optical beam L (see FIG. 2) modulated in accordance with image data supplied from an image data supply source R (also see FIG. 2) such as magnetic resonance imaging (MRI) instrumentation, the exposed recording material A is thermally developed to form color, thereby outputting a hard copy with a formed image.

The recording material A that can be developed thermally with the thermal developing apparatus of the invention to be used in the thermal developing section of the forming apparatus 10 may be selected from various recording materials of thermal development (thermal color formation) type that permit the recording of a latent image by exposure. Examples include a light-sensitive thermally developable recording material having an image forming layer in which at least 50% of the binder is composed of a latex and which contains an organic silver salt and its reducing agent, a light-sensitive thermally developable recording material having an image forming layer containing heat-responsive microcapsules incorporating an electron donating colorless dye, a compound having both an electron receiving portion and a polymerizable vinyl monomer portion in the same molecule and a photopolymerization initiator, and a light-sensitive thermally developable recording material having an image forming layer containing heat-responsive microcapsules incorporating an electron donating colorless dye, an electron accepting compound, a polymerizable vinyl monomer and a photopolymerization initiator. Other light-sensitive thermally developable recording materials that are suitable for use in the present invention are described in Unexamined Published Japanese Patent Application (kokai) Nos. 87827/1991 and 211252/1992.

The forming apparatus 10 which uses the above-described recording material A to produce prints (hard copies) having a visible image formed in accordance with the image data supplied from the image data supply source R basically comprises, in the order of transport of the recording material A, a recording material supply section 12, a width regulating section 14, an image exposing section 16, a thermal developing section 18 that uses the thermal developing apparatus of the invention, and a delivery tray 80.

FIG. 1 is a simplified view and does not show all components of the forming apparatus 10 for the sake of clarity. It should, however, be noted that in addition to the components shown in FIG. 1, transport rollers and guides for transporting the recording material A and various kinds of sensors may be provided as needed in the forming apparatus 10.

The recording material A is typically in the form of a stack (bundle) of a specified number of sheets, say, 100 sheets which are contained in a bag, bound with a strap or otherwise packaged. The stack is contained in a dedicated magazine 20, from which individual sheets are supplied into the forming apparatus 10 and subjected, one by one, to image formation.

The recording material supply section 12 (which is hereinafter referred to as the "supply section 12") is a site at which a sheet of the recording material A is taken from the magazine 20 and supplied to the width regulating section 14 located downstream the transport of the recording material A (this is what is meant by the term "downstream" as used hereinafter) and it comprises two loading sections 22 and 24, sheet feeding means using suckers 26 and 28 and supply roller pairs 30 and 32 that are arranged in the loading sections 22 and 24, respectively, transport roller pairs 34 and 36, and transport guides 38, 40 and 42.

The loading sections 22 and 24 are sites at which the magazines 20 each containing the recording material A are loaded in specified positions. The illustrated forming apparatus 10 has two loading sections 22 and 24, which are loaded with magazines 20 that usually contain different sizes of recording material A [e.g., 356×432 mm for use in CT and MRI and 257×364 mm for use in FCR (Fuji Computed Radiography)].

The sheet feeding means provided in the loading section 22 (or 24) sucks the recording material A in position by means of the sucker 26 (or 28), transports it by moving the sucker 26 (or 28) by a known moving means such as a link mechanism and supplies it into the transport roller pair 30 (or 32) that is provided in the respective loading section 22 (or 24). The recording material A supplied into the supply roller pair 30 is transported to the downstream width regulating section 14 by means of the transport roller pairs 34 and 36 as it is guided by the transport guides 38, 40 and 42 whereas the recording material A supplied into the supply roller pair 32 is transported to the downstream width regulating section 14 by means of the transport roller pair 36 as it is guided by the transport guides 40 and 42.

The width regulating section 14 is a site at which the recording material A is subjected to registration in a direction perpendicular to the direction of its transport (which direction for registration is hereinafter referred to as the "direction of width"), namely, to side registration in the direction of main scanning in the downstream image exposing section 16 before the recording material A is transported to the downstream image exposing section 16 by means of a transport roller pair 44.

The method of achieving side registration in the width regulating section 14 is not limited in any particular way and various known methods may be mentioned, such as the method of using a registering plate that comes into contact with an end face of the recording material A in the direction of width so as to perform its positioning and a pushing means that pushes the recording material A in the direction of width until an end face of it comes into contact with the registering plate, and the method of using the same registering plate and a guide plate or the like that is movable in accordance with the size of the recording material A in the direction of width so that it regulates the transport of the recording material A in the direction of width until it comes into contact with the registering plate as in the first method.

It should be noted that side registration (i.e., registration of the recording material in the exposure) may be "center-referenced" (referenced to the center of the recording material A in the direction of width) or "end face-referenced" (referenced to an end of the recording material A in the direction of width).

The image exposing section 16 (which is hereinafter referred to as the "exposing section 16") is a site at which the recording material A is exposed imagewise by exposure to scanned optical beams and it comprises an exposing unit 46 and an auxiliary scanning transport means 48.

Figure 2:
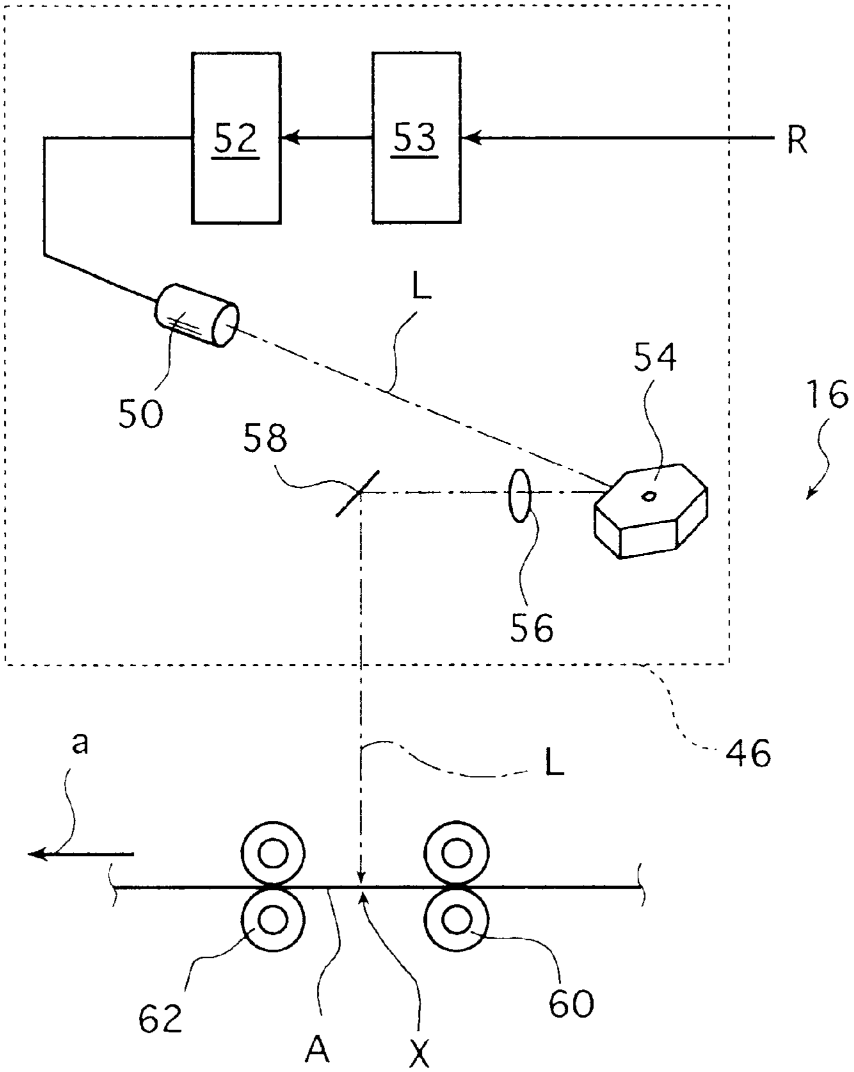
FIG. 2 shows diagrammatically the image exposing section of the image forming apparatus shown in FIG. 1.

FIG. 2 shows the exposing section 16 in conceptual form. The exposing unit 46 is a known optical beam scanner with which an optical beam L modulated in accordance with the image to be recorded is deflected in the main scanning direction (normal to the paper of FIGS. 1 and 2) and allowed to be incident in the specified recording position X. Having this function, the exposing unit 46 comprises a light source 50, an exposure control device 52 for driving the light source 50, a data processing section 53, a polygonal mirror 54 which is a light deflector, an fθ lens 56 and a benddown mirror 58.

Besides these components, the exposing unit 46 optionally has various members that are commonly used in an optical beam scanner such as a collimator lens and a beam expander that shape the light beam L issuing from the light source, tilt correcting optics and an optical path changing mirror.

The light source 50 issues the optical beam L of a narrow band wavelength range in accordance with the spectral sensitivity characteristic of the recording material A. Image data from the image data supply source R such as MRI or CT instrumentation is sent to the data processing section 53, where the supplied image data is subjected to necessary processing such as calibration-dependent correction before it is supplied to the exposure control device 52.

Thus, the image data after being processed in the data processing section 53 is sent to the exposure control device 52, which drives the light source 50 in accordance with the received image data, i.e., the image to be recorded, so that it issues the optical beam L modulated in accordance with the image data.

In the forming apparatus 10, the optical beam L is modulated by a known method such as pulse (width or numbers) modulation or intensity modulation. In the illustrated case, direct modulation, or modulation by drive of the light source 50 with the exposure control device 52, is performed to modulate the optical beam L in accordance with the image to be recorded. This is not the sole method to be employed and external modulation may be performed using a spatial modulating device such as an AOM (acoust-optical modulator), an EOM (electro-optical modulator) or a liquid-crystal shutter array.

The thus modulated optical beam L from the light source 50 is deflected in the main scanning direction with the polygonal mirror 54, adjusted with the fθ lens 56 to be imaged at the recording position X, has its optical path altered by the benddown mirror 58 and is allowed to be incident at the recording position X.

The illustrated forming apparatus 10 is intended to perform monochromatic image recording and the exposing unit 46 has only one light source 50. If the present invention is to be used in recording a color image, one should use an exposing unit having three light sources that emit optical beams at wavelengths dependent on the spectral sensitivity characteristics R (red), G (green) and B (blue) of a color light-sensitive material.

The auxiliary scanning transport means 48 comprises two transport roller pairs 60 and 62 positioned on opposite sides of the recording position X (scanning line) and the recording material A, as it is held in the recording position X, is transported in an auxiliary scanning direction normal to the main scanning direction (as indicated by arrow a in FIG. 2) by means of the transport roller pairs 60 and 62. As already mentioned, the optical beam L modulated in accordance with the image to be recorded has been deflected in the main scanning direction, so the recording material A is exposed by two-dimensional scanning with the optical beam, thereby recording a latent image.

With the latent image being thusly recorded in the exposing section 16, the recording material A is then transported upward by means of transport roller pairs 64 and 66 and so forth to be fed into the thermal developing section 18. The thermal developing section 18 is a site where the thermal developing apparatus of the present invention is used such that a heating drum as heating means heats the recording material A to perform thermal development for making the latent image visible. Having this function, the thermal developing section 18 comprises a heating drum 68, an endless belt 70, a stripping finger 72, support rollers 74*a*–74*d* for the endless belt 70, and an inlet roller pair 76.

The heating drum 68 has a heating source, for example a light source such as a halogen lamp or other heating source such as an electric heater built in for heating purposes. The drum has its surface heated or held by a known means at a temperature that is determined by the temperature for thermal development of the recording material A and it also rotates about the shaft 68*a*.

The endless belt 70 is supported and stretched between the four support rollers 74*a*, 74*b*, 74*c* and 74*d* so that it is pressed into wrapping engagement with the heating drum 68. Thus, the endless belt 70 runs synchronously along with the rotation of the heating drum 68 so that it cooperates with the latter to pinch and transport the recording material A.

The stripping finger 72 is used to strip the recording material A from the heating drum 68. To this end, the stripping finger 72 is adapted to either make light contact with the heating drum 68 or depart from it as determined by the timing of transport of the recording material A along with the rotation of the heating drum 68.

After being fed into the thermal developing section 18 by means of the transport roller pair 66, the recording material A is pinched and transported by the inlet roller pair 76 so that it is fed into the space between the heating drum 68 and the endless belt 70. As the heating drum 68 rotates, the recording material A pinched between the heating drum 68 and the endless belt 70 is transported with it being held in close contact with the heating drum 68, so that it is thermally developed by the heat from the drum 68, whereupon the latent image formed by exposure becomes visible.

When the advancing end of the recording material A has come close to the stripping finger 72, the latter contacts the heating drum 68 lightly and gets into the space between the heating drum 68 and the recording material A so that the latter separates from the former.

The thermal developing apparatus of the invention is characterized in that the surface of the heating drum 68 (heating medium) is not flat but has fine asperities.

As already mentioned in connection with the prior art, if dust or other foreign matter is deposited on the heating drum having a flat surface, the recording material A "floats" microscopically and uneven thermal development will occur. Similarly, if a flaw occurs on the surface of the heating medium, uneven thermal development occurs in the nearby area, again causing uneven densities in the resulting image.

Some types of the recording material A produce gas by thermal development and the gas may often adversely affect the color formation on the recording material A. Especially, the color density often varies abnormally due to the gas confined between the recording material A and the heating drum during thermal development.

In contrast, the thermal developing apparatus of the present invention is characterized by having fine asperities on the surface of the heating drum 68. Even if dust or other foreign matter is deposited on the surface of the heating drum 68, they are "buried" in the asperities and there will be no problem of the aforementioned "floating" of the recording material A. Even if a flaw occurs on the surface of the heating drum 68, there will be no change in the state of contact between the heating drum 68 and the recording material A.

In case of gas production, the gas can be promptly evacuated to the exterior through the fine asperities to prevent advantageously the gas from adversely affecting the color formation on the recording material A. Especially, in the illustrated apparatus in which the heating drum 68 comes into contact with the image recording surface (image forming layer side) to perform thermal development, the effect is noticeable.

Therefore, using the thermal developing apparatus of the present invention, one can ensure that the entire surface of the recording material A is heated uniformly and consistently at all times, thereby preventing gas produced during thermal development from adversely affecting the image and ensuring consistent formation of high-quality images having even and appropriate color densities on the (light-sensitive thermally developable) recording materials A.

In the thermal developing apparatus of the present invention, there are no particular limitations on the height (depth or size) of the asperities to be formed on the surface of the heating drum 68. It should, however, be noted that if the asperities are unduly small, evacuation of gas produced during thermal development and "burying" of dust or other foreign matter can not be performed effectively; if the asperities are excessively large, the efficiency of thermal development will deteriorate markedly and unevenness occurs in thermal development.

The fine asperities are preferably at least 1 $\mu$m high in order to evacuate gas advantageously. Dust and other foreign matter that are deposited on the surface of the heating drum 68 are typically of a size ranging from several to ten-odd $\mu$m. Considering this fact and other factors such as the heating efficiency, it is preferred that the asperities for the purpose of evacuating gas have a height of at least 1 $\mu$m (or a surface roughness Ra of at least 1 $\mu$m) and that those for the purpose of "burying" dust and other foreign matter (or removing both of them) have a height of at least 10 $\mu$m (or a surface roughness Ra of at least 10 $\mu$m) In both cases, the fine asperities have preferably a height of not more than 100 $\mu$m (a surface roughness Ra of not more than 100 $\mu$m) considering the efficiency of thermal development. If the asperities are within this range, gas produced during thermal development can be evacuated advantageously and/or the "floating" of the recording material A due to dust and other foreign matter is effectively prevented and yet satisfactory thermal development can be performed consistently without suffering from unevenness in the result and any other problems.

Microscopically, some areas of the recording material A in the process of thermal development fail to contact the surface of the heating drum 68, so compared to the case of using a heating drum (heating medium) having a flat surface, the efficiency of heat transfer to the recording material A that is achieved with the thermal developing apparatus of the present invention is somewhat low. Nevertheless, the asperities on the surface of the heating drum 68 are fine and formed in all areas that are to make intimate contact with the recording material A. Therefore, by setting the heating drum 68 at an appropriate temperature as determined by the color to be formed on the recording material A, the entire surface of the latter can be heated uniformly enough to achieve satisfactory thermal development.

The method of forming asperities on the surface of the heating drum 68 is not limited in any particular way and depending on the constituent material of the drum surface (which is typically a metal such as aluminum or stainless steel, that are optionally coated with a resin such as Teflon on the surface), various known methods of surface treatment to form a rough surface may be employed as exemplified by mechanical roughening (e.g. grinding and polishing or application of a laser beam) or roughening with chemicals.

Figure 3:
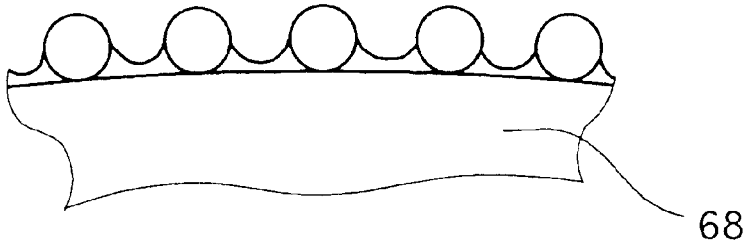
FIG. 3 shows schematically how a surface of an exemplary heating medium in the thermal developing apparatus of the invention looks like microscopically.

A particularly preferred method of forming asperities is the use of a hard coating agent having fine particles dispersed therein. The hard coating agent comprises a curable liquid resin having fine particles dispersed therein. If this agent is applied to the surface of the heating drum 68 and dried (to cure the resin), the fine particles in the resin form fine asperities on the surface of the heating drum 68 as shown in FIG. 3.

Various kinds of resins and fine particles can be employed as long as they have adequate heat resistance. Exemplary resins include polyimide resins and epoxy resins, and exemplary fine particles include those of metals such as stainless steel and ceramics such as silica, zirconia, magnesia and alumina, and mixtures thereof. An appropriate amount of the fine particles may be added to and dispersed in the liquid resin to prepare the desired hard coating agent.

The desired hard coating agent may also be selected from commercial products, of which suitable examples include CERAMA COAT CP2010, CERAMA COAT CP2020, CERAMA COAT CP2030, CERAMA COAT 667, CERAMA COAT 592, CERAMA COAT 512 and CERAMA COAT 538 (all being produced by Aremco Products).

Another preferred method of forming asperities comprises grinding or otherwise processing the surface of the heating drum 68 to form grooves thereon regularly or irregularly. When using this method, the pitch of the grooves to be formed is preferably not more than 10 $\mu$m for the purpose of removing gas produced by thermal development.

The recording material A to be used in the thermal developing apparatus of the present invention is preferably matted to form a matte layer on the surface that is to make contact with the heating drum 68. By using the so treated recording material A, one can perform thermal development in a higher heat efficiency.

An image recording material is also known that has a thermally liquefiable lubricant contained in a surface protective layer. The recording material A having this protective layer (or back coating layer) is preferably used in the present invention. The advantage of using such a recording material A is that the lubricant which substantially melts upon heating "fills up" the asperities on the surface of the heating drum 68, thereby allowing thermal development to be performed in an even higher heat efficiency.

The heating source to be used with the heating drum 68 is not limited to any particular type and various known heating means may be employed, as exemplified by the aforementioned light source (e.g. halogen lamp) and electric heaters. It is preferred that the heating source is a rod-type heating source. One rod-type heating source may be located in a center of the heating drum 68 or a plurality of the rod-type heating sources may be located equally along an inner circumferential wall surface of the heating drum 68.

The temperature of the heating drum 68 and the time for which thermal development is to be performed with the drum are not limited to any particular values and may be determined as appropriate for the recording material A to be used. The time of thermal development may be adjusted by altering the transport speed of the recording material A depending upon its type or stopping its transport after it has been completely accommodated in the thermal developing section 18.

As already mentioned, the recording material A that ends the thermal development on the heating drum 68 is separated from the latter by means of the stripping finger 72. Then, the detached recording material A emerges from the apparatus to appear on the tray 80 as a hard copy having a reproduced image.

Figure 4:
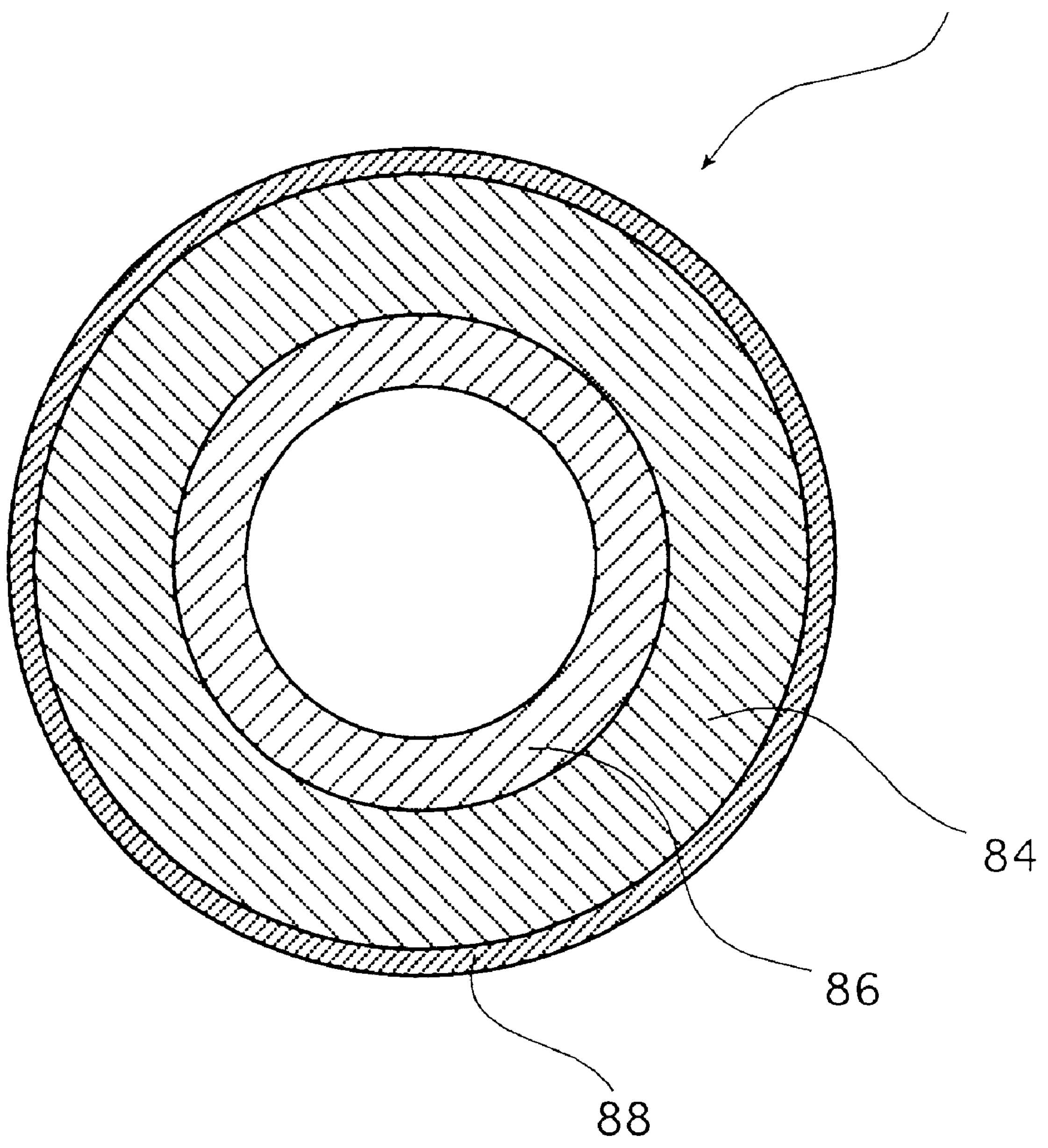
FIG. 4 shows in conceptual form another example of the heating means used in the thermal developing apparatus of the invention.

FIG. 4 shows another example of the heating means to be used in the thermal developing apparatus of the invention. The heating means generally indicated by 82 is used in place of the heating drum 68 in the thermal developing section 18 of the forming apparatus 10. As shown, the heating means 82 comprises a cylindrical fixed heating medium 84, a heating source 86 such as a rubber heater that heats the fixed heating medium 84 from inside, and a heat transfer member (a moving heating medium) 88 which is loosely fitted over the fixed heating medium 84 and which slides and rotates around the fixed heating medium 84. The heat transfer member 88 is either a cylindrical element or an endless belt that have their inner surface in sliding contact with the outer surface of the fixed heating medium 84 and that can rotate about it. The heat transfer member 88 is composed of aluminum or other material that has an adequate thermal conductivity and has asperities on the outer surface that are as fine as those formed on the outer circumferential contact surface of the heating drum 68. The asperities may be formed by the same method as used to form the asperities on the contact surface of the heating drum 68. Heat transfer grease is applied to the surface of the fixed heating medium 84 (and to the inner surface of the heat transfer member 88), thereby ensuring easy and smooth sliding of one member to the other.

In the illustrated heating means 82, the fixed heating medium 84 is fixed whereas the heat transfer member 88 rotates about it so that in cooperation with an endless belt 70, the heat transfer member 88 pinches and transports the recording material A, which is therefore thermally developed by the heat transfer member 88 heated with the fixed heating medium 84.

The method of rotating the heat transfer member 88 also is not limited in any particular way and known methods may be employed, as exemplified by idler driving or belt driving.

Figure 5:
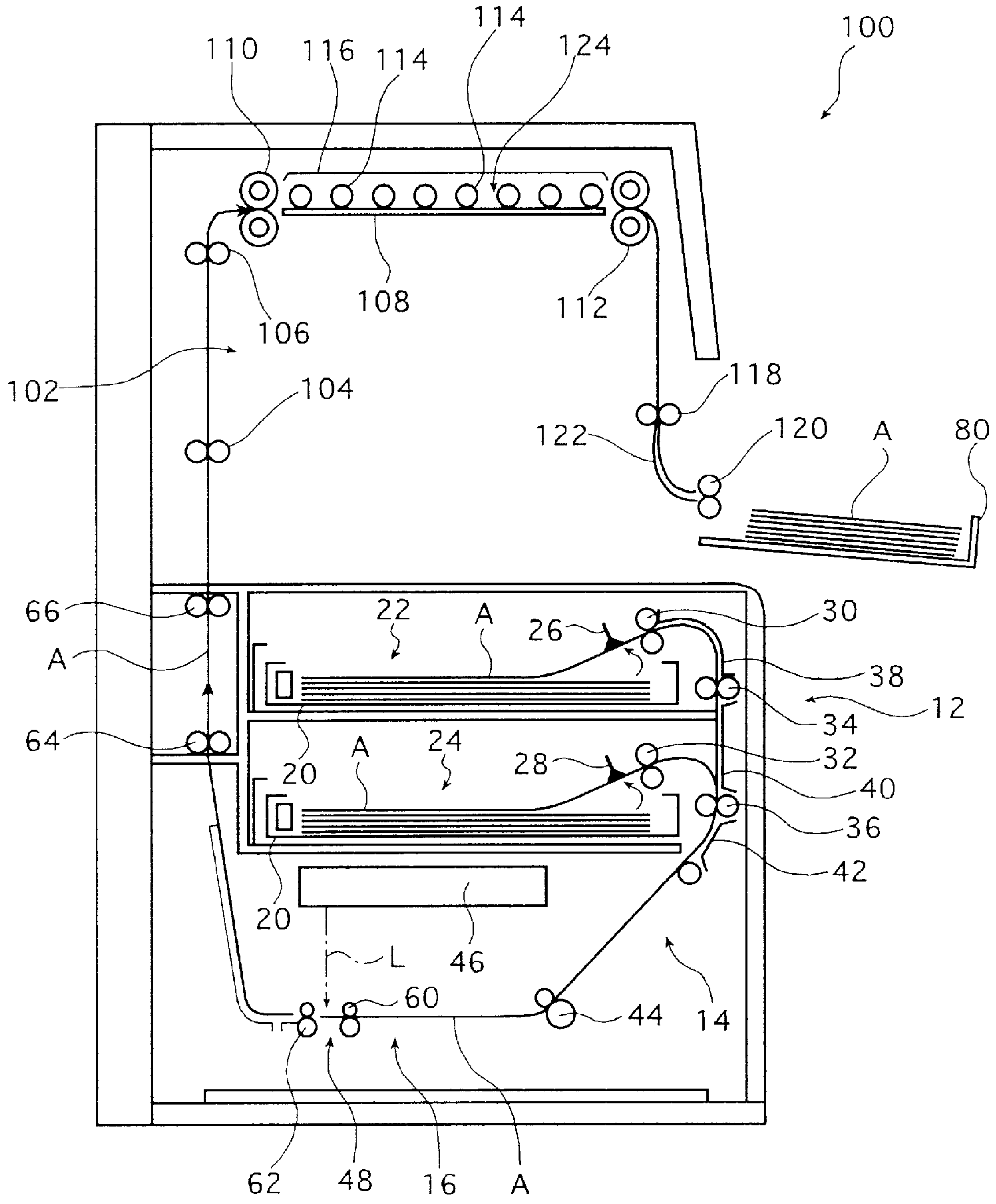
FIG. 5 shows diagrammatically another embodiment of the image forming apparatus using the thermal developing apparatus of the invention.

FIG. 5 shows diagrammatically another embodiment of the image forming apparatus using the thermal developing apparatus of the invention. The illustrated forming apparatus 100 is a medical imager similar to the aforementioned forming apparatus 10 as shown in FIG. 1, and basically comprises, in the order of transport of the recording material A, the recording material supply section 12, the width regulating section 14, the image exposing section 16, a thermal developing section 102 that uses the thermal developing apparatus of the invention, and the delivery tray 80. The forming apparatus 100 as shown in FIG. 5 has basically the same construction as the forming apparatus 10 as shown in FIG. 1 except for the thermal developing section 102. Then, same reference numerals denote same elements and the following explanation is mainly directed to the different portions.

Not only in the aforementioned forming apparatus 10, but also in the forming apparatus 100, the recording material A supplied from the supply section 12 and subjected to side registration in the width regulating section 14 is exposed two-dimensionally to the optical beam L in the image exposing section 16 to record a latent image, after which the material A is transported through the transport roller pairs 64 and 66 to the thermal developing section 102.

The illustrated thermal developing section 102 comprises transport roller pairs 104 and 106; a plate-shaped or planar plate heater 108 which comes two-dimensionally into contact with a surface of the recording material A (image recording surface in the illustrated case) so that the material A is heated to be thermally developed; transfer roller pairs 110 and 112 located upstream and downstream of the plate heater 108, respectively; a plurality of press rollers 114 to press the recording material A against the plate heater 108; a heat insulating cover 116 to improve the efficiency of heat development; ejection roller pairs 118 and 120; and a transport guide 122.

In the illustrated case, similar asperities as seen on the surface of the heating drum 68 are formed on the contact surface of the plate heater 108 with the recording material A.

The recording material A transported into the thermal developing section 102 is then transported upward through the transport roller pairs 104 and 106 and turned toward the horizontal transport direction before being transported to the transfer roller pair 110.

The recording material A is inserted through the transfer roller pair 110 into a transport pathway 124 formed in the space between the plate heater 108 and the press rollers 114. The recording material A of which the image recording surface is in sliding contact with the plate heater 108 is transported through the transfer roller pairs 110 and 112 while being pressed against the plate heater 108 by the press rollers 114, whereupon the material A is thermally developed by the heat of the plate heater 108. The distance between the transfer roller pairs 110 and 112 is shorter than the length of the recording material A.

The thermally developed recording material A is then transported downward by the ejection roller pairs 118 and 120 through the transport guide 122 into the tray 80.

In the thermal developing section 102 of the invention, the plate heater 108 that serves as a heating medium has fine asperities formed on the surface thereof. Therefore, dust or other foreign matter is "buried" and gas produced by thermal development is evacuated. Consequently, uneven thermal development due to "floating" of dust or other foreign matter and adverse effect of the gas on color formation are avoided thereby yielding high-quality images having even and appropriate color densities.

The plate heater 108 is not limited to any particular type and various known heating means including a means using a heating element such as a nichrome wire, a means using a light source such as a halogen lamp, and a means for heating with hot air may be used. It should be however noted that the temperature is preferably set at a higher level because the both ends of the plate heater 108 release a large amount of heat.

It is more preferred to increase the heat capacity on the upstream side or to elevate the temperature on the upstream side by a method in which the plate heater 108 is provided with a thickness gradient to increase the heat capacity on the upstream side, or another method in which the plate heater 108 is provided with a temperature gradient to decrease the temperature from the upstream side to the downstream side. As a result, the large temperature drop on the upstream side can be prevented when the recording material A is entered on the plate heater 108, and the heat distribution of the recording material A can be made uniform.

Furthermore, the sliding contact surface of the plate heater 108 with the recording material A is preferably subjected to a lubricating treatment such as a fluoroplastic coating. Alternatively, a lubricating sheet may be provided on the surface of the plate heater 108. It should be noted that, when using the lubricating sheet, fine asperities must be formed on the surface thereof.

Metallic rollers, resin rollers and rubber rollers can be used as the press rollers 114. A plurality of press rollers 114 are preferably arranged over the entire surface of the plate heater 108. Alternatively, in known means using belt drive or gear drive, at least one of the press rollers 114 may be used as a transport roller to transport the recording material A.

In order to perform smooth thermal development of the recording material A while preventing buckling and other inconveniences, the press rollers 114 located in the most upstream and downstream are preferably arranged near to the ends of the plate heater 108 (preferred distance between the axis of rotation and the end is within 5 mm). In addition, the distance between the adjacent press rollers 114 is made unequal to avoid streaky development unevenness due to uneven transport of the recording material A pinched between the press rollers 114 and the plate heater 108.

It should be noted that the pressure of the press rollers 114 on the recording material A is preferably in the range of about 0.1 $kg/M^2$ to 20 $kg/m^2$.

Figure 6:
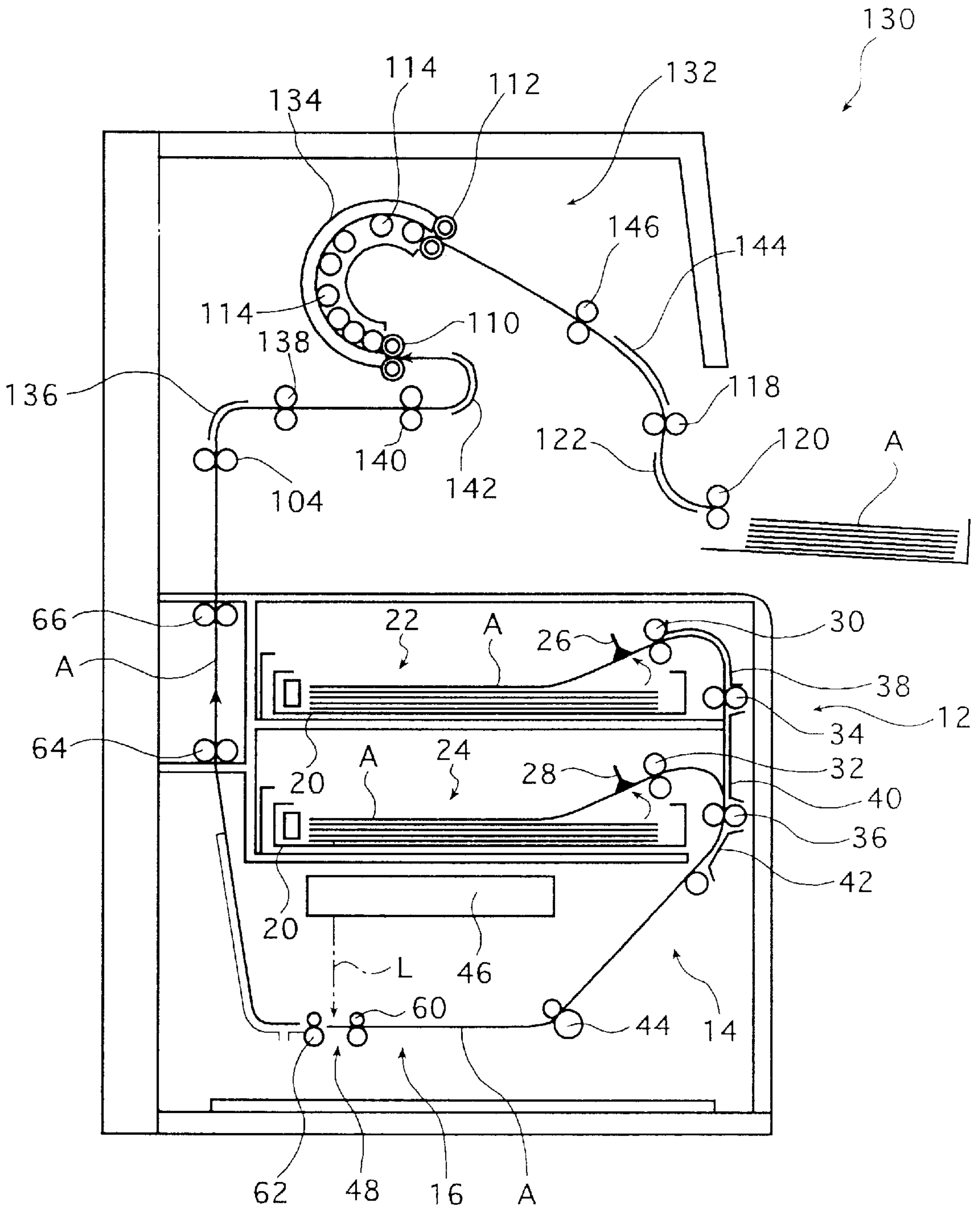
FIG. 6 shows diagrammatically still another embodiment of the image forming apparatus using the thermal developing apparatus of the invention.

FIG. 6 shows diagrammatically still another embodiment of the image forming apparatus using the thermal developing apparatus of the invention. The forming apparatus 130 shown in FIG. 6 has basically the same construction as the forming apparatus 100 shown in FIG. 5 except for the shape of a plate heater 134. Then, same reference numerals denote same elements and the following explanation is mainly directed to the different portions.

As in the aforementioned embodiments, even in the forming apparatus 130, the recording material A supplied from the supply section 12 and subjected to side registration in the width regulating section 14 is exposed two-dimensionally to the optical beam L in the image exposing section 16 to record a latent image, after which the material A is transported through the transport roller pairs 64 and 66 to a thermal developing section 132.

The recording material A transported into the thermal developing section 132 is then transported upward through the transport roller pair 104, turned toward the lateral transport direction, passed through transport roller pairs 138 and 140 and turned again in a transport guide 142 to be transported to the transfer roller 110.

The illustrated plate heater 134 has a curved arc form and is provided with press roller pairs 114 arranged on the inner side thereof. The contact surface (inner surface) of the plate heater 134 with the recording material A has fine asperities formed on the surface thereof, as in the aforementioned plate heater 108.

The recording material A is inserted through the transfer roller pair 110 into the transport pathway formed in the space between the plate heater 134 and the press rollers 114. The recording material A of which the rear surface is in sliding contact with the plate heater 134 is transported through the transfer roller pairs 110 and 112 while being pressed against the plate heater 134 by the press rollers 114, whereupon the material A is thermally developed by the heat of the plate heater 134.

The plate heater 134 in the illustrated forming apparatus 130 has also fine asperities formed on the surface thereof as in the aforementioned embodiments. Therefore, uneven thermal development due to "floating" of dust or other foreign matter and adverse effect of the gas on color formation are avoided thereby yielding high-quality images having even and appropriate color densities. In the illustrated case, adverse effect of the gas evacuated from the back layer can be advantageously removed, because the plate heater 134 is in contact with the side opposite to the image forming surface.

In the illustrated forming apparatus 130, the plate heater 134 has a curved form and the inner side thereof serves as a transport pathway. Then, the recording material A is transported while the advancing end being pressed against the plate heater 134. Consequently, buckling of the recording material A can be advantageously prevented.

The curvature of the curved plate heater 134 is not limited to any particular value and can be appropriately set depending on the size of the recording material A and the time of thermal development. If the radius is however too small, sufficient thermal development can not be achieved in some cases. Therefore, the radius is preferably set at not less than 0.05 m.

The shape of the plate heater 134 may not be a complete arc, but a little deformed as required.

The thermally developed recording material A is transported downward by a transport roller pair 146 while being guided by a guide 144, and then transported by the ejection roller pairs 118 and 120 through the guide 122 into the tray 80.

While the thermal developing apparatus of the present invention has been described above in detail, it should be understood that the invention is by no means limited to the foregoing embodiments and that various improvements and modifications can of course be made without departing from the scope and spirit of the invention. It should be noted that the illustrated thermal developing apparatus pinches and transports the recording material A by means of the endless belt and the heating drum or the heat transfer member, or the two transport roller pairs. The invention is not however limited thereto and other various known recording material transport means can be used, as far as the recording material A can be pinched and transported. Thus, in stead of using the endless belt and the heating drum or the heat transfer member, nip rollers arranged on the peripheral surface of the heating drum or the heat transfer member parallel to the longitudinal axis thereof may be used together with the heating drum or the heat transfer member. Alternatively, the two transport roller pairs may be replaced by an endless belt and at least two nip rollers. The latter may be used as the press rollers.

As described above on the foregoing pages, the present invention provides a thermal developing apparatus that forms color on a light-sensitive thermally developable recording material by thermal development with a heating medium, which is characterized in that even in the case where dust or other foreign matter is deposited on the surface of the heating medium or where a flaw occurs on its surface, the entire surface of the light-sensitive thermally developable recording material can be uniformly heated to achieve thermal development without unevenness in its result, and gas produced by thermal development does not adversely affect the color formation, because the gas can be advantageously evacuated. Therefore, according to the present invention, high-quality images having even and appropriate color densities can be formed in a consistent manner.

What is claimed is:

1. A thermal developing apparatus which heats an imagewise exposed light-sensitive thermally developable recording material to form color comprising:

a heating medium for heating said light-sensitive thermally developable recording material, said heating medium having fine asperities on its contact surface to come in contact with said light-sensitive thermally developable recording material; and a nip transport means for pinching and transporting said light-sensitive thermally developable recording material so that said light-sensitive thermally developable recording material is held in two-dimensional contact with at least one portion of the contact surface of said heating medium.

2. The thermal developing apparatus according to claim 1, wherein the fine asperities on the contact surface of said heating medium are 1–100 $\mu$m high.

3. The thermal developing apparatus according to claim 1, wherein the fine asperities on the contact surface of said heating medium are 10–100 $\mu$m high.

4. The thermal developing apparatus according to claim 1, wherein a constituent material composing said contact surface of said heating medium which has the fine asperities is a material selected from the group consisting of aluminum, stainless steel, a resin coating aluminum and a resin coating stainless steel.

5. The thermal developing apparatus according to claim 1, wherein said contact surface of said heating medium having the fine asperities is a rough surface obtained by a surface treatment for roughening a surface of a constituent material of said contact surface of said heating medium.

6. The thermal developing apparatus according to claim 1, wherein said contact surface of said heating medium having the fine asperities comprises a constituent material composing said contact surface of said heating medium, a curable liquid resin coated and dried on said constituent material and fine particles dispersed in the dried curable liquid resin.

7. The thermal developing apparatus according to claim 6, wherein said curable liquid resin is a polyimide resin or an epoxy resin and wherein said fine particles are particles selected from the group consisting of metal particles, silica particles, zirconia particles, magnesia particles, alumina particles and mixtures thereof.

8. The thermal developing apparatus according to claim 1, wherein said contact surface of the heating medium having the fine asperities is formed by coating on a constituent material composing said contact surface a hard coating agent which comprises a curable liquid resin having fine particles dispersed therein and drying the coated hard coating agent.

9. The thermal developing apparatus according to claim 1, wherein said heating medium is movable and wherein said nip transport means pinches and transports said light-sensitive thermally developable recording material in cooperation with said heating medium as said light-sensitive thermally developable recording material is held in two-dimensional contact with at least one portion of the contact surface of said heating medium.

10. The thermal developing apparatus according to claim 1, wherein said heating medium is a rotatable heating drum comprising a cylindrical contact surface having said fine asperities and at least one heating source built in for heating purposes.

11. The thermal developing apparatus according to claim 10, wherein said at least one heating source is a rod-type heating source located in a center of said rotatable heating drum or a plurality of rod-type heating sources located equally along an inner circumferential wall surface of said rotatable heating drum.

12. The thermal developing apparatus according to claim 11, wherein said rod-type heating source is a rod-type light source for heating or a rod-type electric heater.

13. The thermal developing apparatus according to claim 12, wherein said rod-type light source is a rod-type halogen lamp.

14. The thermal developing apparatus according to claim 1, wherein said nip transport means comprises an endless belt which allows said light-sensitive thermally developable recording material to be held in two-dimensional contact with at least one portion of the contact surface of said rotatable heating medium so that said light-sensitive thermally developable recording material is pinched between the endless belt and the heating medium, said endless belt running synchronously along with action of the heating medium; and a plurality of support rollers supporting and stretching said endless belt.

15. The thermal developing apparatus according to claim 14, wherein said heating medium is a rotatable heating drum comprising a cylindrical contact surface having said fine asperities and at least one heating source built in for heating purposes.

16. The thermal developing apparatus according to claim 15, wherein said endless belt is wrapped around at least semicircle of the cylindrical contact surface of the rotatable heating drum.

17. The thermal developing apparatus according to claim 1, further comprising an inlet roller pair for feeding said light-sensitive thermal developable recording material into a space between the heating medium and the nip transport means, said inlet roller pair being provided closely in a start portion in two-dimensional contact with said heating medium and said nip transport means.

18. The thermal developing apparatus according to claim 1, further comprising a stripping finger for striping said light-sensitive thermal developable recording material from said heating medium, said stripping finger being provided closely in an end portion in two-dimensional contact with said heating medium and said nip transport means.

19. The thermal developing apparatus according to claim 1, wherein said heating medium comprises a heating source, a cylindrical fixed heating medium having the heating source built in and a cylindrical heat transfer member which holds in sliding contact with an outer surface of the cylindrical fixed heating medium and rotates around the cylindrical fixed heating medium and which has the fine asperities on its outer contact surface.

20. The thermal developing apparatus according to claim 19, wherein said heating source is a rubber heater provided along with an inner surface of the cylindrical fixed heating medium.

21. The thermal developing apparatus according to claim 19, wherein heat transfer grease is interposed between an outer surface of the cylindrical fixed heating medium and an inner surface of the cylindrical heat transfer member.

22. The thermal developing apparatus according to claim 1, wherein said heating medium is fixed and wherein said nip transport means pinches and transports said light-sensitive thermally developable recording material in the state that said light-sensitive thermally developable recording material is held in two-dimensional contact with at least one portion of the contact surface of said fixed heating medium.

23. The thermal developing apparatus according to claim 1, wherein said heating medium is a plate heater comprising the contact surface having said fine asperities and at least one heating source built in for heating purposes.

24. The thermal developing apparatus according to claim 23, wherein said plate heater is a planar plate heater having a planer contact surface or a curved plate heater having a curved arc inner contact surface.

25. The thermal developing apparatus according to claim 1, wherein said nip transport means comprises two transfer roller pairs for pinching and transporting said light-sensitive thermally developable recording material, said two transfer roller pairs being located upstream and downstream of the heating medium, respectively; and at least one press roller for pressing said light-sensitive thermally developable recording material against the contact surface of said heating medium having the fine asperities.

26. The thermal developing apparatus according to claim 25, wherein said heating medium is a plate heater comprising the contact surface having said fine asperities and at least one heating source built in for heating purposes.

27. The thermal developing apparatus according to claim 26, further comprising a heat insulating cover for improving an efficiency of heat development due to said plate heater, said heat insulating cover being located behind said at least one press roller.

28. The thermal developing apparatus according to claim 24, wherein said contact surface of said plate heater having said fine asperities is a lubricating contact surface.

29. The thermal developing apparatus according to claim 28, wherein said lubricating contact surface of said plate heater comprises a fluoroplastic coating film subjected to a lubricating treatment on a surface of said plate heater or a lubricating sheet provided on the surface of said plate heater.

* * * * *